United States Patent [19]

Motoi et al.

[11] Patent Number: 4,672,141

[45] Date of Patent: Jun. 9, 1987

[54] POLYALKYLENE ETHER GLYCOLS

[75] Inventors: Masatoshi Motoi, Kanazawa; Yuzo Toga, Himeji; Ichiro Okamoto, Himeji; Tatsuya Kanno, Himeji, all of Japan

[73] Assignee: Daicel Chemical Industries, Ltd., Sakai, Japan

[21] Appl. No.: 841,047

[22] Filed: Mar. 17, 1986

Related U.S. Application Data

[60] Continuation of Ser. No. 664,806, Oct. 25, 1984, abandoned, which is a division of Ser. No. 459,570, Jan. 20, 1983, abandoned.

[30] Foreign Application Priority Data

Jan. 22, 1982 [JP] Japan ................................. 57-8610

[51] Int. Cl.$^4$ ............................................. C07C 41/01
[52] U.S. Cl. ................................... 568/613; 568/606; 549/510
[58] Field of Search ................ 568/606, 613; 549/510

[56] References Cited

U.S. PATENT DOCUMENTS

| | | | |
|---|---|---|---|
| 2,514,982 | 7/1950 | Walters et al. | 568/623 |
| 2,522,155 | 9/1950 | Ballard et al. | 568/623 |
| 2,882,321 | 4/1959 | Dornfeld | 568/623 |

OTHER PUBLICATIONS

Saegusa et al., Macromolecules, 6(1) 26–32, 1973.
Bogatskii et al., J. Org. Chem. USSR, vol. 7, 1971, pp. 584–590.
Dreyfuss et al., "1,3 Epoxides and Higher Epoxides", Ring Opening Polymerization, Marcel Dekker, New York (1969), pp. 111–114, 152.

*Primary Examiner*—Howard T. Mars
*Attorney, Agent, or Firm*—Flynn, Thiel, Boutell & Tanis

[57] ABSTRACT

Poly-2-methyl-1,3-propylene ether glycol has at least two repeating units of —$CH_2$—$CH(CH_3)$—$CH_2$—O— and hydroxyl groups at both ends. It is applicable as the soft segment component for polyester and polyurethane, and resin materials in various fields.

2 Claims, 2 Drawing Figures

POLYALKYLENE ETHER GLYCOLS

This application is a continuation of U.S. Ser. No. 664,806, filed Oct. 25, 1984, which is a division of U.S. Ser. No. 459,570, filed Jan. 20, 1983 both now abandoned.

The present invention relates to new polyalkylene ether glycols. More particularly, the invention relates to poly-2-methyl-1,3-propylene ether glycols which are new polyalkylene ether glycols having two or more repeating units comprising

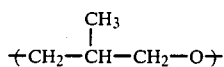

and hydroxyl groups at both ends.

As the polyalkylene ether glycols, there have been known polyethylene glycol, poly-1,2- and 1,3-propylene ether glycol, polytetramethylene ether glycol, polyhexamethylene ether glycol and copolymers of them. These polyalkylene ether glycols have been used broadly as lubricating agents or starting materials therefor in the molding of rubbers or working of fibers, ceramics and metals, as important starting materials for cosmetics and medicines, as starting materials or additives for water-based paints, paper coatings, adhesives, cellophanes, printing inks, abrasives and surfactants and as starting materials for alkyd resins.

Recently, there have been developed thermoplastic elastomers having an intrinsic structure which exhibits elastic properties in the molecules unlike conventional elastomers such as rubbers which exhibit the elastic properties by chemical crosslinkage and they are used broadly in practice. The thermoplastic elastomers have many advantages such as easiness of processing thereof, reduction of the processing time, easiness of utilization of scraps thereof and easy realization of broad mechanical properties ranging from hard to soft properties. Further development of these elastomers is expected, since they fill up gaps among conventional thermoplastic resins, thermosetting resins and vulcanized rubbers. Commercially available thermoplastic elastomers may be classified roughly into poly(styrene/butadiene) elastomers, polyester elastomers, polyamide elastomers, polyurethane elastomers and blends of ethylene/propylene copolymer rubber with polypropylene. These thermoplastic elastomers excluding the blends are typical block copolymers having soft segments and hard segments incorporated in a straight-chain structure in blocks in the course of the polymerization. Polyalkylene ether glycols are used frequently as the soft segments in the elastomers such as polyesters, polyamides and polyurethanes. Reasons therefor are that the polyalkylene ether glycols having hydroxyl groups at both ends react easily with a carboxyl and isocyanate to form an ester and urethane, respectively, and that the polyalkylene ether glycols have a skeleton comprising segments bonded with ether bonds and, therefore, the resulting polymers have a high elasticity and excellent low temperature properties and resistance to hydrolysis, salt solution and microorganisms. The function of the polyalkylene ether glycol as soft segment is closely related to the chemical structure and physical properties of the polyalkylene ether glycol. To exhibit these advantages, it is desirable from the viewpoint of reactivity that both terminal hydroxyl groups of the alkylene ether glycol are primary and also it is desirable from the viewpoint of elasticity and recovery of elasticity that the alkylene ether glycol has a low glass transition temperature and it per se is not crystallized even if the molecular weight thereof is high. However, polyalkylene ether glycol having such a chemical structure and physical properties has not been known yet.

For example, polyethylene glycol and polytetramethylene ether glycol used frequently as soft segments have a high reactivity, since they have primary hydroxyl groups at both ends. However, if their molecular weight is increased to above about 1500, they per se are crystallized to make it impossible to exhibit the function as the soft segment sufficiently. Polypropylene ether glycol has a defect of low reactivity, since one of the terminal hydroxyl groups is secondary, while it is difficultly crystallized even if the molecular weight is increased.

There have been known high molecular substances having repeating units of, for example,

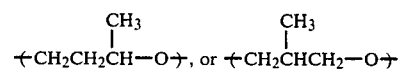

obtained by the polymerization of alkyloxetanes. However, such high molecular substances having hydroxyl groups at both ends of the high molecular chain thereof have not been known yet.

After intensive investigations made under these conditions, the inventors have found poly-2-methyl-1,3-propylene ether glycols which are new polyalkylene ether glycols of the formula:

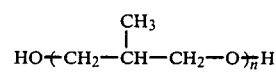

wherein n is at least 2, having two or more repeating units comprising

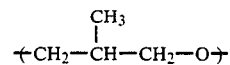

and hydroxyl groups at both ends. In the above illustrated formula, n is, in general, from 2 to 100. A preferable lower limit of n is 4. A more preferable one is 10. The most preferable one is 12.

The poly-2-methyl-1,3-propylene ether glycol of the present invention is a new polyalkylene ether glycol. It is easily reactive with a carboxyl or isocyanate, since it has primary hydroxyl groups at both ends and it is difficultly crystallized, while it has a high molecular weight, since the repeating units

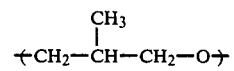

have an asymmetric methyl group as a side chain. The poly-2-methyl-1,3-propylene ether glycol is used as a preferred soft segment in elastomers such as polyester, polyamide and polyurethane.

The poly-2-methyl-1,3-propylene ether glycol may be synthesized by many processes. For example, it may be synthesized by reacting starting 2-methyl-1,3-propanediol with acetyl chloride to obtain 3-chloro-2-methylpropyl acetate, then subjecting the same to alkali fusion to effect ring closure, thereby obtaining 3-methyloxetane, subjecting the obtained 3-methyloxetane to ring-opening polymerization reaction in the presence of a catalyst such as perchloric acid-fuming sulfuric acid, perchloric acid-acetic anhydride, fluorosulfonic acid and borofluoric acid-acetic anhydride-boron trifluoride etherate and hydrolyzing the polymer to obtain the intended poly-2-methyl-1,3-propylene ether glycol.

When oxonium salt of borofluoric acid or a Lewis acid-acetic anhydride is used as a catalyst in the above illustrated process, it may happen that a compound having no hydroxyl group at either end is produced in addition to polyalkylene ether glycol having hydroxyl groups at the terminals. Such a compound may react with carboxyl or isocyanate group to be capped therewith. Thereafter it may be employed as a soft segment for polyester and polyurethane so as to adjust a molecular weight of the polyester and polyurethane. If the reaction product satisfies the below given formula (1) in respect to a relation between hydroxyl value and a number-average molecular weight and then has a hydroxyl group content of at least 50 % at both ends, it may be of practical use. Preferably the polymer product of the invention has a value of the formula (1) of at least 0.7, especially 0.9. In other words, it has a hydroxyl group content of at least 90 % at the terminals. If this value is less than 0.5, the polymer has a poor reactivity unfavorably.

$$\frac{H \cdot \overline{M}_n}{56.1 \times 1000 \times 2} \geq 0.5 \qquad (1)$$

wherein H represents a hydroxyl value and $\overline{M}_n$ represents a number-average molecular weight.

The poly-2-methyl-1,3-propylene ether glycol of the present invention may be used broadly not only as the soft segment of elastomers such as polyester, polyamide and polyurethane but also for the same purposes as those of polyalkylene ether glycols. Namely, it is used as lubricating agents or starting materials therefor, starting materials for cosmetics and medicines, starting materials or additives for water-based paints, paper coatings, adhesives, cellophanes, printing inks, abrasives and surfactants and starting materials for alkyd resins.

Figure 1:
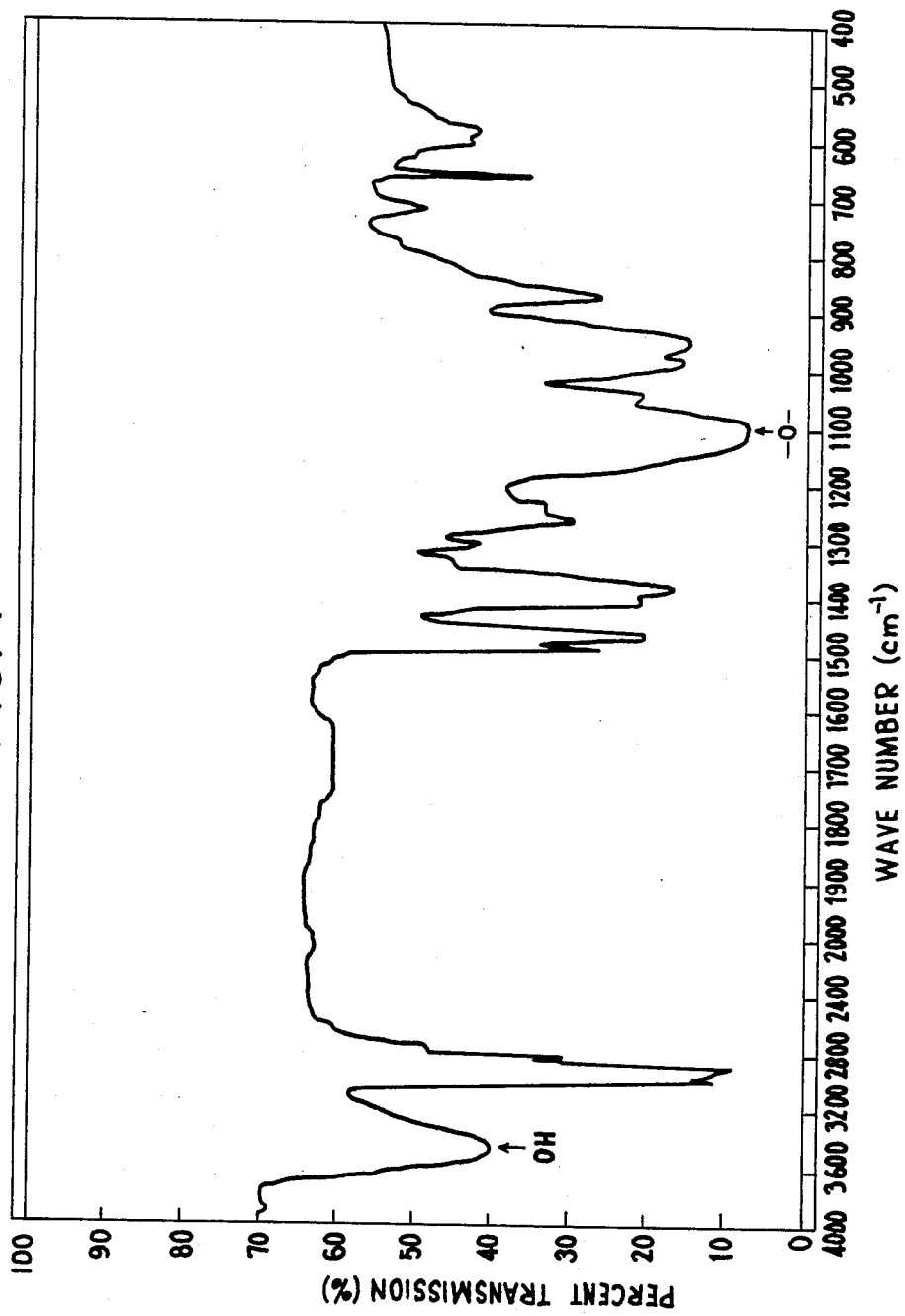
FIG. 1 shows infrared absorption spectrum of the product obtained in Example 1.

The following examples will further illustrate the present invention, which by no means limit the invention. In the examples, parts are given by weight and the substances were identified according to the following methods:

(1) Nuclear magnetic resonance spectrum:

A nuclear magnetic resonance device JNM-C-60 HL (a product of Nihon Denshi Co.) was used.

(2) Infrared absorption spectrum:

A grating infrared spectrophotometer IRA-2 (a product of Nihon Bunko Co.) was used.

(3) Hydroxyl value:

Hydroxyl value was determined according to JIS K1557.

(4) Number-average molecular weight:

A vapor pressure osmometer was used.

EXAMPLE 1

100 parts of 2-methyl-1,3-propanediol was mixed with 101 parts of acetyl chloride. The mixture was heated to 100° C. for 8 h to obtain 151 parts of 3-chloro-2-methylpropyl acetate (yield: 90%). Then, 100 parts of this acetate was treated with potassium hydroxide/sodium hydroxide under the condition of alkali fusion to obtain 31 parts or ringclosed 3-methyloxetane (yield: 58%).

In advance to polymerization, sodium metal was added to the above obtained 3-methyloxetane in order to dehydrate the product. After distilling the product, 100 parts of 3-methyloxetane was introduced into a reactor. The reactor was cooled down to −70° C. with a freezing mixture of dry ice and methanol placed outside the reactor. Then 3 parts of 70% perchloric acid was added to the reactor and further 15 parts of 15% fuming sulfuric acid was added dropwise slowly, while stirred, in such a manner that the reaction mixture might be of the homogeneous phase. The reaction mixture was allowed to stand at the internal temperature of −10° C. for 10 hours. 50 parts of distilled water and then 100 parts of a 5 wt. % aqueous sodium hydroxide solution were added to the reaction mixture and the whole was heated under reflux for 1 h. The reaction mixture was transferred into a separating funnel to separate an organic layer (upper layer) from an aqueous layer. After extraction from the aqueous layer with n-butanol three times, the extracts were combined with the organic layer and dried. n-Butanol was distilled off by means of an evaporator to obtain 68 parts of a transparent oily substance (yield: 68% based on 3-methyloxetane).

Figure 2:
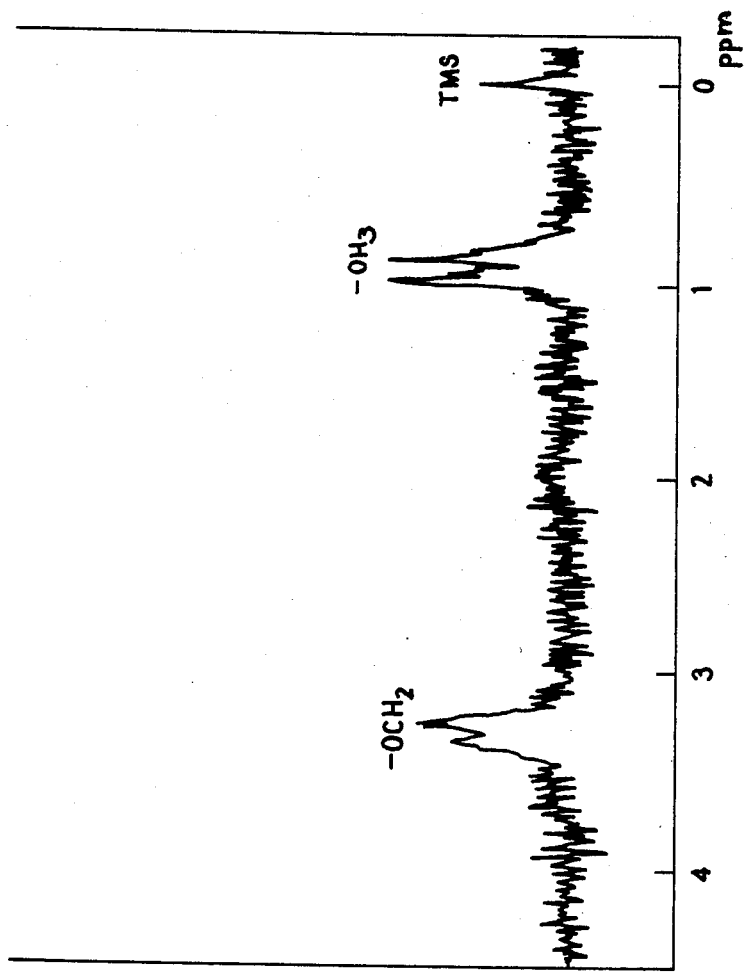
FIG. 2 is nuclear magnetic resonance spectrum of the same product.

Infrared absorption spectrum of the obtained transparent oily substance is shown in FIG. 1 and nuclear magnetic resonance spectrum thereof is shown in FIG. 2. From the results of elementary analysis, infrared absorption spectrum and nuclear magnetic resonance spectrum, the product was identified with poly-2-methyl-1,3-propylene ether glycol.

The product had hydroxyl value (H) of 348 and number-average molecular weight ($\overline{M}_n$) determined by the vapor pressure osmosis method of 315. The value of the above formula (1) was 0.98 and the hydroxyl group content at both ends was 98%. The average number of 2-methyl-1,3-propylene ether units in the polymer, in other words an average polymerization degree, was 4.1.

| Elementary analysis: | Found | Calculated |
|---|---|---|
| C | 62.96% | 62.89% |
| H | 11.24% | 11.18% |

EXAMPLE 2

100 parts of 3-methyloxetane obtained in the same manner as shown in Example 1 was treated in the same manner as shown in Example 1 to obtain 59 parts of a transparent oily substance, except that 1 part of 70% perchloric acid and 5 parts of 28% fuming sulfuric acid were used and the reaction mixture was maintained at the internal temperature of −30 ° C. for 5 hours. The yield of the oily substance was 59% based on 3-methyloxetane.

It was revealed that the product had hydroxyl value (H) of 69 and number-average molecular weight ($\overline{M}_n$) determined by the vapor pressure osmosis method of 1550. The value of the above formula (1) was 0.95 and the hydroxyl group content at both ends was 95%. The average polymerization degree of the polymer was 21.3.

| Elementary analysis: | Found | Calculated |
|---|---|---|
| C | 65.38% | 65.88% |
| H | 11.05% | 11.18% |

The infrared absorption spectrum and nuclear magnetic resonance spectrum were substantially the same as those obtained in Example 1.

EXAMPLE 3

100 parts of 3-methyloxetane as obtained in the same manner as shown in Example 1 and 1.4 parts of acetic anhydride were introduced into a reactor, which was cooled down to the inside temperature of $-70\,°$ C. with a freezing mixture of dry ice and methanol from the outside. Then, 2.3 parts of 70% perchloric acid was added thereto dropwise slowly, while stirred. After the addition had finished, the reaction mixture was gradually heated to the room temperature. It was allowed to stand for 70 hours until the reaction finished. Thereafter hydrolysis and purification were conducted in the same way as described in Example 1. The obtained polymer was a colorless, transparent, viscous liquid and weighed 80 parts. The yield was 80 % based on 3-methyloxetane. It had a hydroxyl value of 49, a number-average molecular weight of 2280 and an average polymerization degree of 31.

EXAMPLE 4

100 parts of 3-methyloxetane as produced in the same way as shown in Example 1 was introduced into a reactor, which was cooled down to the inside temperature of $-70°$ C. with a freezing mixture of dry ice and methanol from the outside. 0.9 part of fluorosulfonic acid was added thereto dropwise slowly, while stirred. When the addition had finished, the reaction temperature was slowly increased to the room temperature and 20 hours had passed until the reaction was stopped. The hydrolysis and purification were carried out in the same manner as described in Example 1. The polymer as obtained weighed 75 parts and was found a slightly yellow, transparent, very viscous liquid. The yield was 75 % based on 3-methyloxetane. It has a hydroxyl value of 16.6, a number-average molecular weight of 6780 and an average polymerization degree of 94.

The embodiment of the invention in which an exclusive property or privilege is claimed are defined as follows:

1. A process for preparing a polymer having the formula

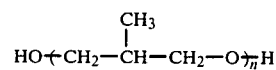

wherein n is a number equal to or greater than 2, which comprises the steps of: reacting 2-methyl-1, 3-propanediol with acetyl chloride to obtain 3-chloro-2-methylpropyl acetate; then effecting ring closure of said 3-chloro-2-methylpropyl acetate, by alkali fusion, to obtain 3-methyloxetane, then effecting ring-opening polymerization of said 3-methloxetane, in the presence of a catalyst selected from the group consisting of perchloric acid-fuming sulfuric acid, perchloric acid-acetic anhydride, and fluorosulfonic acid, to obtain a polymeric reaction product and then hydrolyzing that polymeric reaction product to obtain said polymer.

2. A process for preparing polymer having the formula

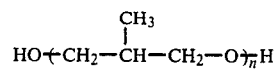

wherein n is a number equal to or greater than 2, which comprises the steps of: effecting ring-opening polymerization of 3-methloxetane, in the presence of a catalyst selected from the group consisting of perchloric acid-fuming sulfuric acid, perchloric acid-acetic anhydride, and fluorosulfonic acid, to obtain a polymeric reaction product and then hydrolyzing that polymeric reaction product to obtain said polymer.

* * * * *